United States Patent [19]

Shea

[11] Patent Number: 5,449,320
[45] Date of Patent: Sep. 12, 1995

[54] COLLAPSIBLE DUCT COUPLING

[76] Inventor: Lawrence E. Shea, 165 Lake Dr., San Bruno, Calif. 94066

[21] Appl. No.: 124,710

[22] Filed: Sep. 24, 1993

[51] Int. Cl.6 .............................................. F24F 7/06
[52] U.S. Cl. ...................................... 454/49; 454/28
[58] Field of Search ................. 454/28, 168, 258, 342, 454/357, 49

[56] References Cited

U.S. PATENT DOCUMENTS 1,926,298 9/1933 Moore ................................. 454/342
2,804,095 8/1957 Schauenburg ...................... 454/168
4,662,268 5/1987 Beavers .............................. 454/342
4,867,106 9/1989 Staats ................................. 110/162

Primary Examiner—Raymond A. Nelli
Attorney, Agent, or Firm—William F. Hamrock

[57] ABSTRACT

Fiberglass reinforced plastic duct exhaust systems including sections of the duct system joined together by collapsible collar plastic joints having low melting points which collapse or drop-out of the system when exposed to high temperatures.

12 Claims, 9 Drawing Sheets

COLLAPSIBLE DUCT COUPLING

FIELD OF THE INVENTION

The present invention generally relates to providing fire protected fume exhaust ducts, and more particularly, to the use of collapsible couplings or collars interconnected within duct work to reduce the progression of fire within the duct work.

DESCRIPTION OF THE PRIOR ART

Duct work for corrosive vapor and fume exhaust systems is used in a large number of industries such as semiconductor manufacturing, pharmaceuticals, plating shops, paper and pulp mills, waste water plants, and many other chemical processing plants. The corrosive vapors and fumes must be removed through the ducts for the protection of the workers and to prevent the deterioration of equipment.

Among the common materials used previously for ducts to exhaust the corrosive vapors and fumes have been stainless steel, coated metals, polyvinyl chloride, polypropylene, and fiberglass reinforced plastics. There is concern among building officials, insurance companies, fire marshalls and fire officials in general as to what happens within plastic exhaust ducts during a fire, and particularly when the ducts are being used in the exhaust mode. Air velocities in exhaust systems can be high, in the order of 2500 feet per minute, with the direction of flow being from the interior of the building to the outside. Most fires start in equipment to which the duct is connected. If the duct material ignites, it can burn progressively within the length of the duct system spreading the fire throughout the system. Thus, when the duct is installed within a building structure, the duct fire can cause extensive damage by spreading the fire progressively throughout the entire structure. Whereas some duct systems are hundreds of feet in length, the damage can be of a large magnitude. Consequently, exhaust duct fires have resulted in tens of millions of dollars in losses in a decade in the United States.

If the ducts are prepared from uncoated metal, while the uncoated metal duct will not burn, they will conduct heat. In such circumstances, it is common practice to insert fire dampers within the system to prevent the fire from spreading. However, uncoated metals are infrequently used for corrosive vapor exhaust in industry because of their relatively poor chemical resistance.

With respect to ducts prepared from plastic materials, plasticized polyvinyl has been used but it gives off corrosive smoke when exposed to fire. Unplasticized PVC and polypropylene are known to melt when exposed to fires and the ducts thereby collapse.

For fiberglass reinforced plastic ducts, their flammability is dependent upon which resins are used in conjunction with the fiberglass. With the exception of a few modified phenolic resins, most resins used for fiberglass reinforced ducts burn fairly readily. Thus, it is conventional to place internal fire protection sprinklers inside of nonmetallic ducts to prevent the spread of fire. On some occasions, special dampening devices are used to block off the duct to prevent air flow and thereby stop the spread of fire.

It is not desirable to close off a fume exhaust duct in event of fire for example by a fire damper. It is preferred for safety reasons to evacuate the smoke generated in a fire. Also, internal fire sprinklers which are sometimes specified to prevent the spread of fire are not desirable since tests have demonstrated that in small ducts of about 10 and 12 inches in diameter, the flow of water from the sprinkler shuts off the air flow within the duct. Thus, it would be desirable not to use dampening devices or sprinklers in exhaust ducts.

In addition there are many situations wherein it would be desirable to use fiberglass reinforced plastic ducts having resin systems other than phenolic based systems, that is, to use resin systems which have good chemical resistance to particular environments but because of their flammability characteristics would ordinarily require dampening devices or sprinklers. Such a situation causes some degree of consternation and often additional expense for an owner of a facility.

It is an object of the present invention to provide fiberglass reinforced plastic duct exhaust systems which are appropriate for use without dampening devices or sprinklers.

It is a further object of the invention to use fiberglass reinforced plastic ducts having resin systems other than phenolic based systems which meet the required industry test standards for use of plastic duct work exhaust systems without dampening devices or sprinklers.

It is another object of the invention to use fiberglass reinforced plastic duct exhaust systems which meet the requirements of the Factor Mutual Research Corporation #4922 Duct Test Standard.

SUMMARY OF THE INVENTION

Briefly stated, in accordance with the present invention, the above objects are obtained by the use of many fiberglass reinforced plastics in duct exhaust systems which were not previously acceptable to Factory Mutual without the use of internal sprinklers. These fiberglass reinforced plastics use resin systems which, although being fire retardant, cannot pass the insurance industry test standards for use in exhaust systems without dampening devices or sprinkler systems being installed therein to prevent the spread of fire throughout the duct system. Included among the fiberglass reinforced plastics in the duct exhaust system of the invention are halogenated resin systems with or without antimony oxide or borax compounds or even unhalogenated resins.

Applicant has overcome the deficiencies relevant to these fiberglass reinforced plastic duct exhaust systems by the novel combined use of a collapsible collar or connecting piece therein hereinafter referred to as the collapsible collar. The collapsible collar is made of thermoplastic material which will melt and either drop out or open up when exposed to fire or high temperature. Thus, by combining the two different plastic materials, the fiberglass reinforced plastics and the thermoplastic material, in the exhaust duct system, the low melt temperature collapsible collar will melt and open up or drop out of the exhaust duct system creating an opening therein when exposed to fire or high temperature. Thus, the opening created in the direct duct exhaust system downstream of the fire will expose the connected ductwork to ambient air entrainment and dramatic temperature dilution of the downstream ductwork. The lower temperature air would maintain the interior surface of the fiberglass reinforced plastic duct below its auto-ignition temperature, and prevent the spread of fire through the duct system.

BRIEF DESCRIPTION OF THE DRAWINGS

Although such novel features believed to be characteristic of the invention are pointed out in the claims, the invention and the manner in which it may be carried out may be further understood by reference to the following disclosure and to the accompanying drawings.

DESCRIPTION OF THE PREFERRED EMBODIMENT

Figure 1:
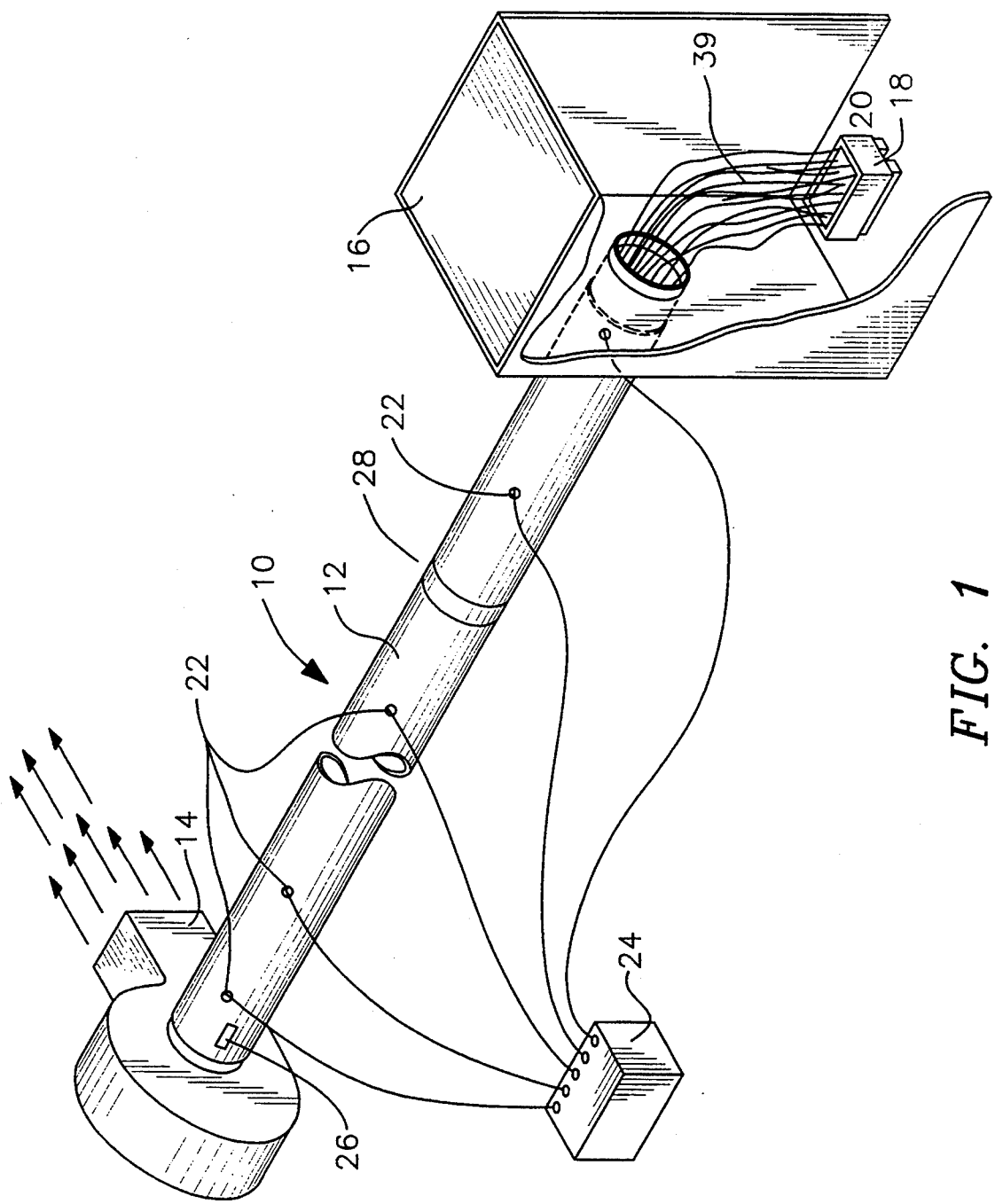
FIG. 1 is a perspective view of Factory Mutual Research Corporation's #4922 horizontal duct test apparatus for ducts to be used without sprinklers or dampening devices.

In order to determine which ducts are appropriate for use without sprinklers or dampening devices, a common test relied on in industry in the Factory Mutual Research Corporation #4922 Duct Test Standard. FIG I shows the typical test apparatus 10 for testing a horizontal duct. In this test, one end of a 24 feet of 12 inch diameter duct 12 is connected to an exhaust blower 14 and the opposite end projects into a draft shield booth 16 containing a pan 18 containing 2.5 gallons of heptane 20. The heptane is ignited and the duct 12 is exposed to a fire generated by the heptane at a rate of about 10,000 BTUs a minute. The duct 12 should not burn from one end to the other end in a period of 15 minutes in order to pass the test. Thermocouples 22 are located along the duct and are connected to temperature recorder 24. The temperature in the thermocouple closest to the exhaust blower 14 should not exceed 1,000° F. In addition, flame may not be observed at sight hole 26 near the exhaust blower. Failure of any of these conditions warrants the failure of the particular ductwork. If the ductwork meets all of the criteria, it passes the test standard, and the duct is considered sufficiently safe to be used without internal sprinklers. A duct joint 28 is shown in the duct 12.

It is thought that if a duct will not burn 24 feet in length in 15 minutes, it probably won't burn 100 feet in an hour. In that period of time a large company fire brigade, or a municipal fire department, can respond to control the spread of fire by conventional fire fighting means. Thus the Factory Mutual test is oriented to controlling the degree of fire damage that may be caused by the spread of fire through an exhaust system.

Figure 2:
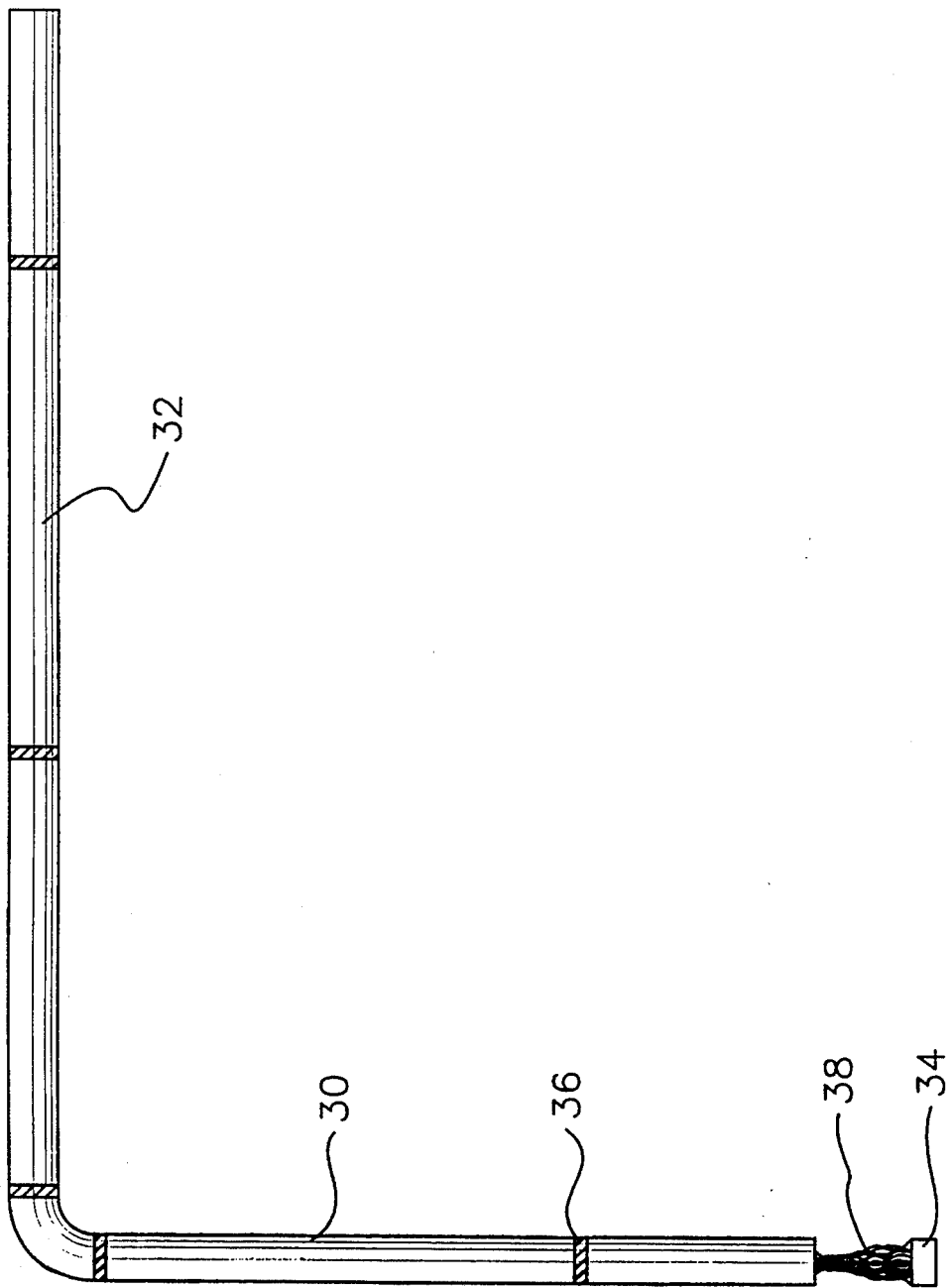
FIG. 2 is a perspective view of the Factory Mutual Research Corporation #4922 vertical/horizontal duct test.

FIG. 2 is directed to an additional fire test conducted by Factory Mutual Research Corporation #4922 test. This is for vertical and horizontal connected ductwork and FIG. 2 depicts only partial test segments thereof. As seen, 15 feet of 12 inch diameter duct 30 is installed in a vertical position and is connected to 24 feet of the same diameter duct 32 in a horizontal position. As in FIG. 1, a pan holding 2.5 gallons of heptane 34 is used as the fuel, and the test is run for 15 minutes. The duct performance must meet the same requirements as the duct shown in FIG. 1, and test requirements specify that the first joint 36 shall be within 5 feet of the flame end 38.

The fiberglass reinforced plastic ducts in accordance with the present invention use fire retardant resins which cannot pass these Factory Mutual tests because their fire resistance is insufficient to prevent the spread of fire throughout the duct as required. The present invention eliminates the necessity of using sprinklers or dampers in these ducts by the novel use of a collapsible collar device. The device is made of thermoplastic material which can be either rigid or elastomeric as required. Preferably, the materials used in the collapsible collar device have a relatively low melting point of about 220° to 400° F. Among the materials found to be satisfactory are polyethylene, polyethylene, polyvinyl chloride and similar thermoplastics. However, there are other materials which can be suitable as long as they comply with the teachings of this invention whether or not they fall within the melting point of said temperature range.

The fire retardant resins used in the fiberglass plastic ducts of the invention do not have low melting points and have relatively high autoignition temperatures. The result is that when exposed to fire, these fiberglass reinforced ducts do not quickly degrade or collapse. However, when their surface temperature at any point reaches their autoignition temperature, they will start on fire. As opposed to that situation, when the state-of-the-art thermoplastic materials are exposed to fire or high heat generally they will melt before they start to burn.

When these two different materials are combined in a common duct system that is exposed to a fire or high heat, the thermoplastic material collapsible collar having a low melting temperature will melt and drop out of the duct before the fiberglass fire retardant resin would ignite. When the thermoplastic material is used to join together sections of reinforced fiberglass fire retardant resin duct, then the low temperature thermoplastic joint collapsible collar first would melt and drop out or open up. The eliminated joint would create an opening in the fiberglass duct downstream of the fire to expose the opened duct section to ambient air entrainment, generally about 72° F., resulting in a dramatic temperature dilution in the downstream duct. The lower temperature air would maintain the interior surface of the fiberglass reinforced plastic duct below its autoignition temperature, thus preventing the spread of fire through the duct system. By combining the two diverse materials, i.e., fiberglass reinforced plastic duct containing fire retardant resins with high autoignition temperatures, and thermoplastic couplings or joints in collapsible collars having relatively low melting temperatures, a duct system is provided which will prevent the progression of a fire along a duct system's length and may also pass the Factory Mutual duct tests. Thus extensive savings are provided by eliminating the cost of a fire protection system of sprinklers or dampers installed in the ductwork.

The present invention is more clearly defined by referring to FIGS. 3-9.

Figure 3:
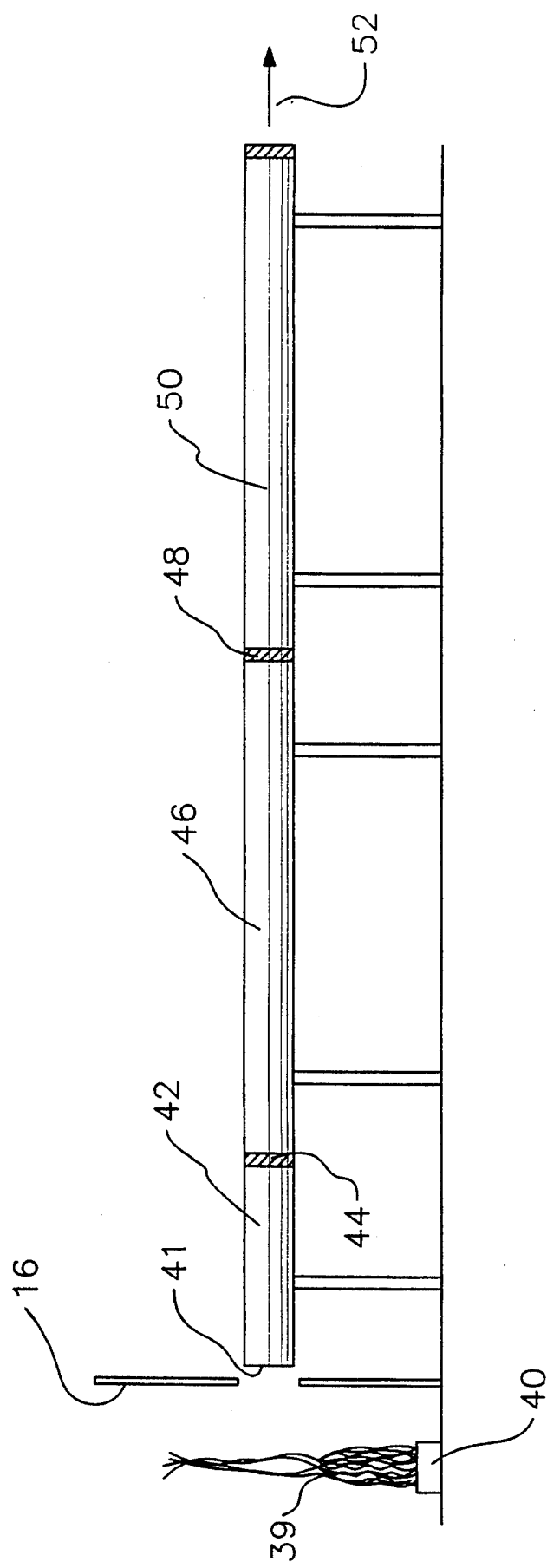
FIG. 3 is a segmented view of a Factory Mutual #4922 horizontal duct test.

FIG. 3 represents a side view of the Factory Mutual #4922 Duct Test. The test standard requires a first horizontal duct joint to be 4 feet from the fire end. The proposed collapsible collar coupling would be used as field joints located as shown. The first collapsible collar coupling, not seen, would be affixed to the equipment on fire 40 simulated here by the booth and heptane fuel source and by the heated air 39. Collapsible collar couplings numbers 44 and 48 would connect fiberglass reinforced duct pieces numbers 42, 46, 50, etc. Collapsible collar couplings would be placed at a maximum on 20 foot centers, and preferably 10 foot centers. Exhaust air 52 leaves the system as shown.

On ignition of the heptane fuel, the flame and heat do not enter the duct immediately. Generally, temperatures 6 inches from the draft shield booth 16 on the downstream duct side do not exceed 600° F. for two to three minutes. This is sufficient time to melt the thermoplastic collapsible collar coupling, not seen, causing it to collapse. This collapse opens up the duct to that point, i.e., the first 6 inches adjacent to the fire source. Such an event would disconnect the remainder of the duct system 42 to 50 and thereafter from a fire source preventing the fire from entering the duct. Once the collapsible collar coupling dropped out or opened up, the duct system itself would be sucking in air 41 at about ambient temperatures on the downstream side of the draft shield booth. Thus, the simulated piece of equipment with an internal fire would become disconnected from the duct system as seen in FIG. 3.

Figure 4:
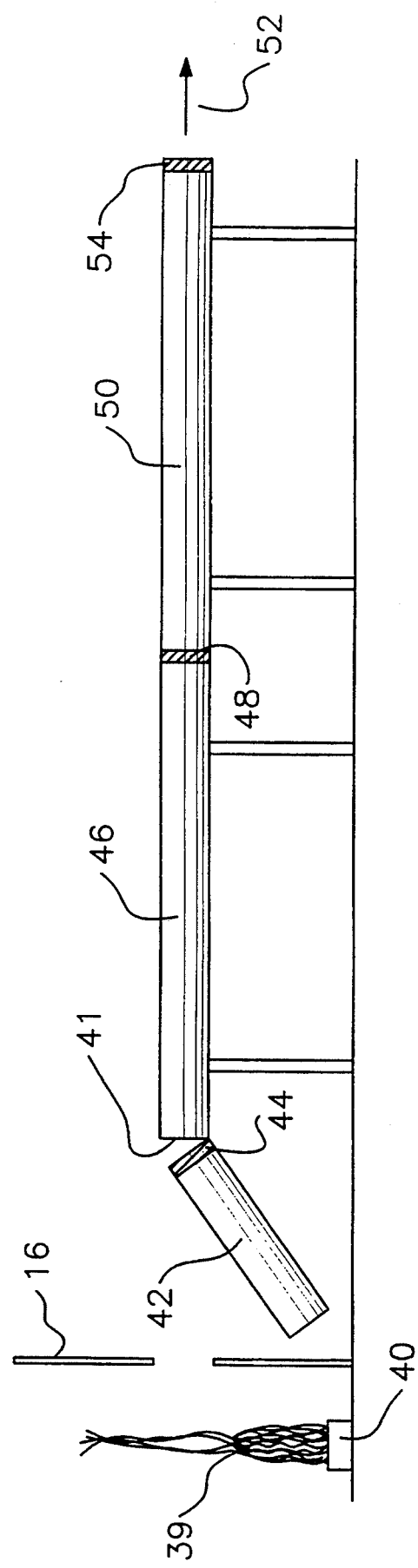
FIG. 4 is a segmented side view of a duct system exposed to fire.

In a progressive fire, if for any reason the first section 42 of the duct would ignite, collapsible collar coupling 44 would also melt as seen in FIG. 4. Duct section 42 would itself drop out or open up and it would be disconnected from downstream duct sections. Now duct section 46 would be entraining ambient temperature air 41 and again the duct system would be protected from the fire.

Figure 5:
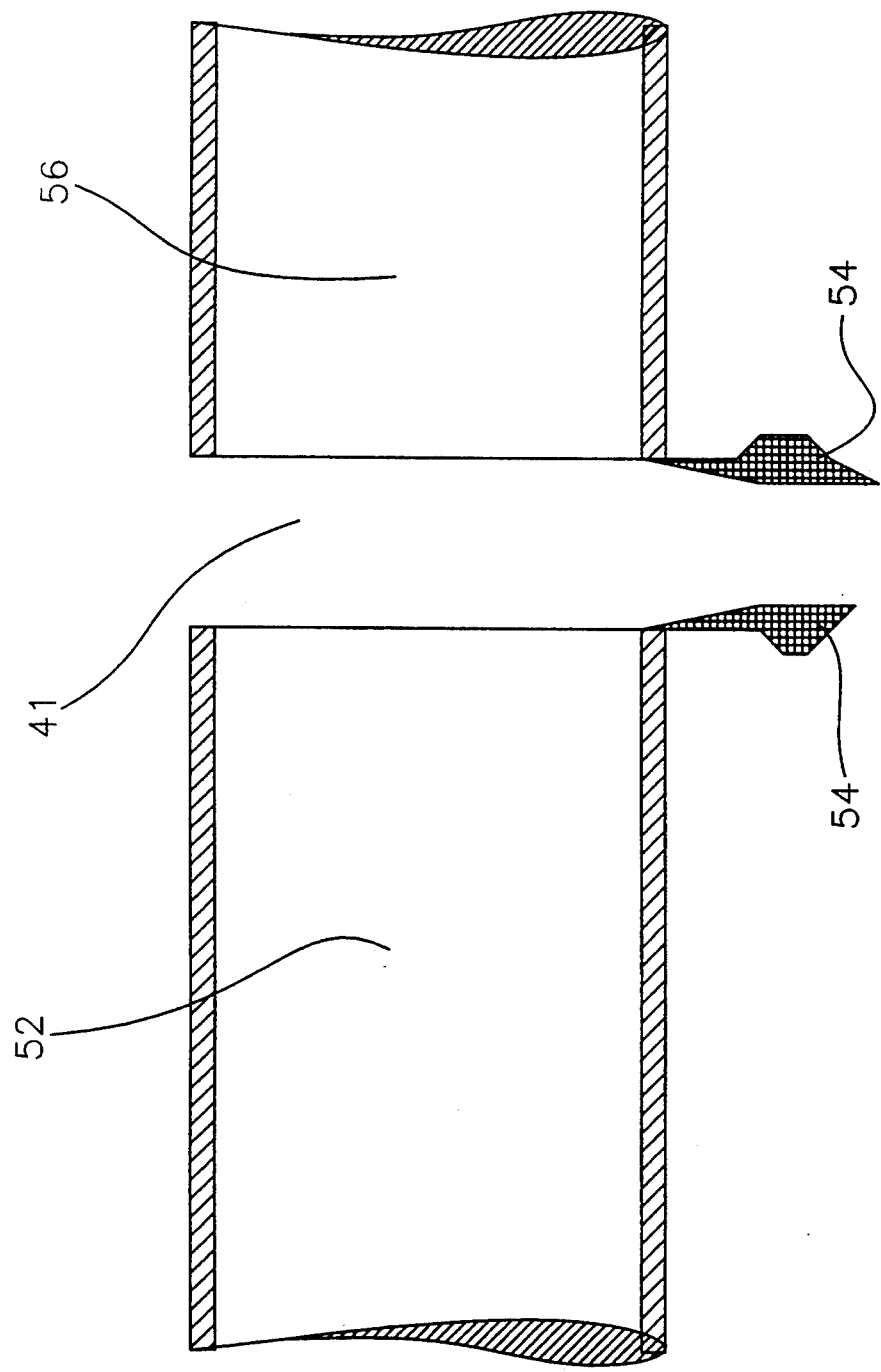
FIG. 5 is a segmented view of duct sections being separated.

Actually, duct section 46 would now be about 5 feet distant from the actual fire and there could be no further concern about entrainment of the fire into that duct piece. This scenario could repeat itself endlessly if and when the fire progressed in the duct system area, each section of duct would gradually become disconnected at 52 and thereafter as each low melt duct temperature collapsible collar coupling would drop out or open at 54, protecting the next successive section of fiberglass reinforced plastic duct 56 as seen in FIG. 5 by dilution with air.

Since the equipment on fire would no longer be having air entrained through it because it would be disconnected from the exhaust blower there is a possibility the fire inside the equipment would self-extinguish if it were able to use up all the available oxygen in a confined area.

Should the fire be exterior to the duct, and depending on its distance of spread, successive collapsible collar couplings downstream in the duct would progressively melt and drop out or open up, always insuring that the next section of duct itself would not be the cause of spreading the fire in the building structure. Thus, a practical and relatively inexpensive method is achieved of providing fire protection to a duct system without the necessity of dampers or internal sprinklers. Since the duct itself is always open and facing the fire area, it can aid in exhausting smoke, and any toxic fumes being generated by nature of the fire itself.

Figure 6:
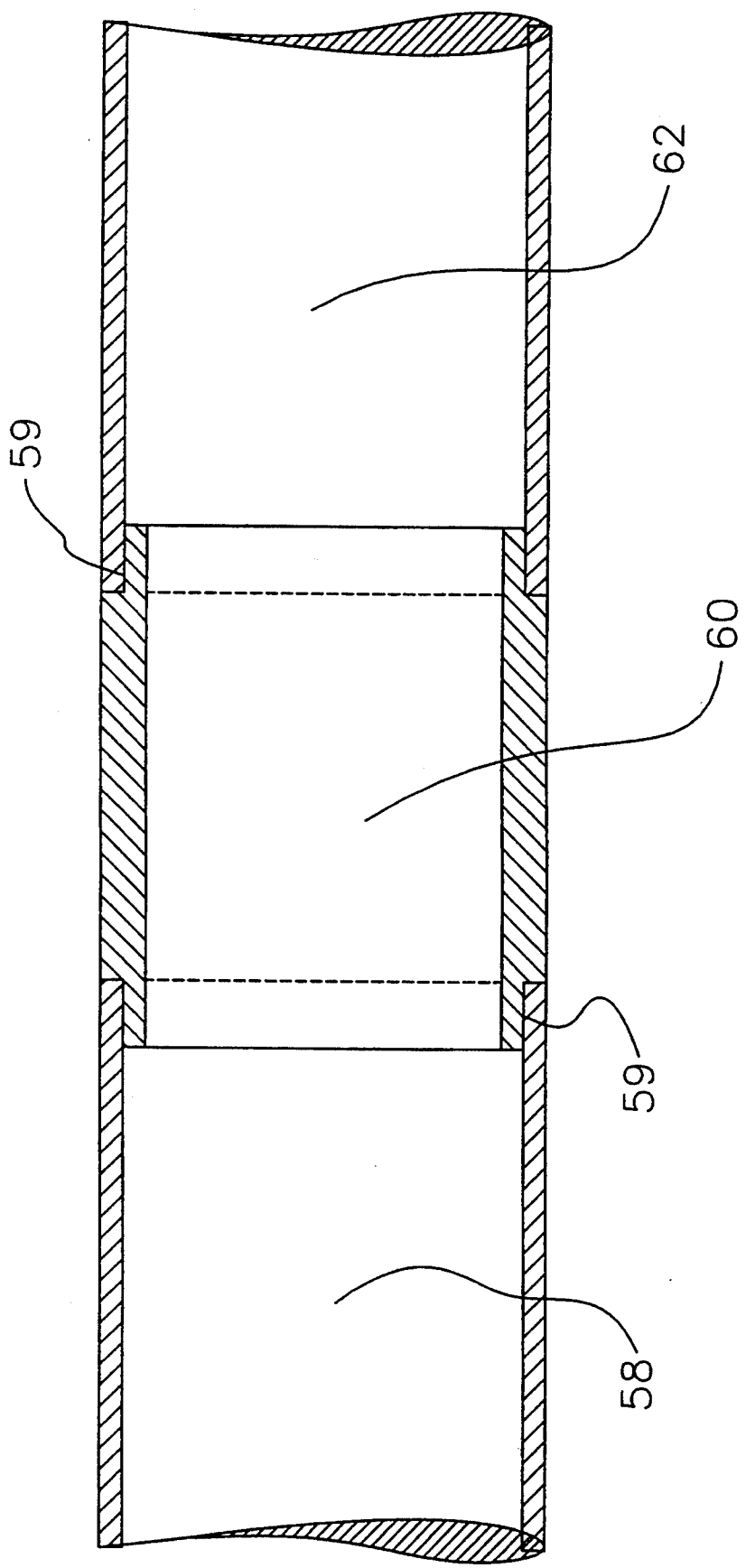
FIG. 6 is a segmented view of proposed collapsible collar attachment.
Figure 7:
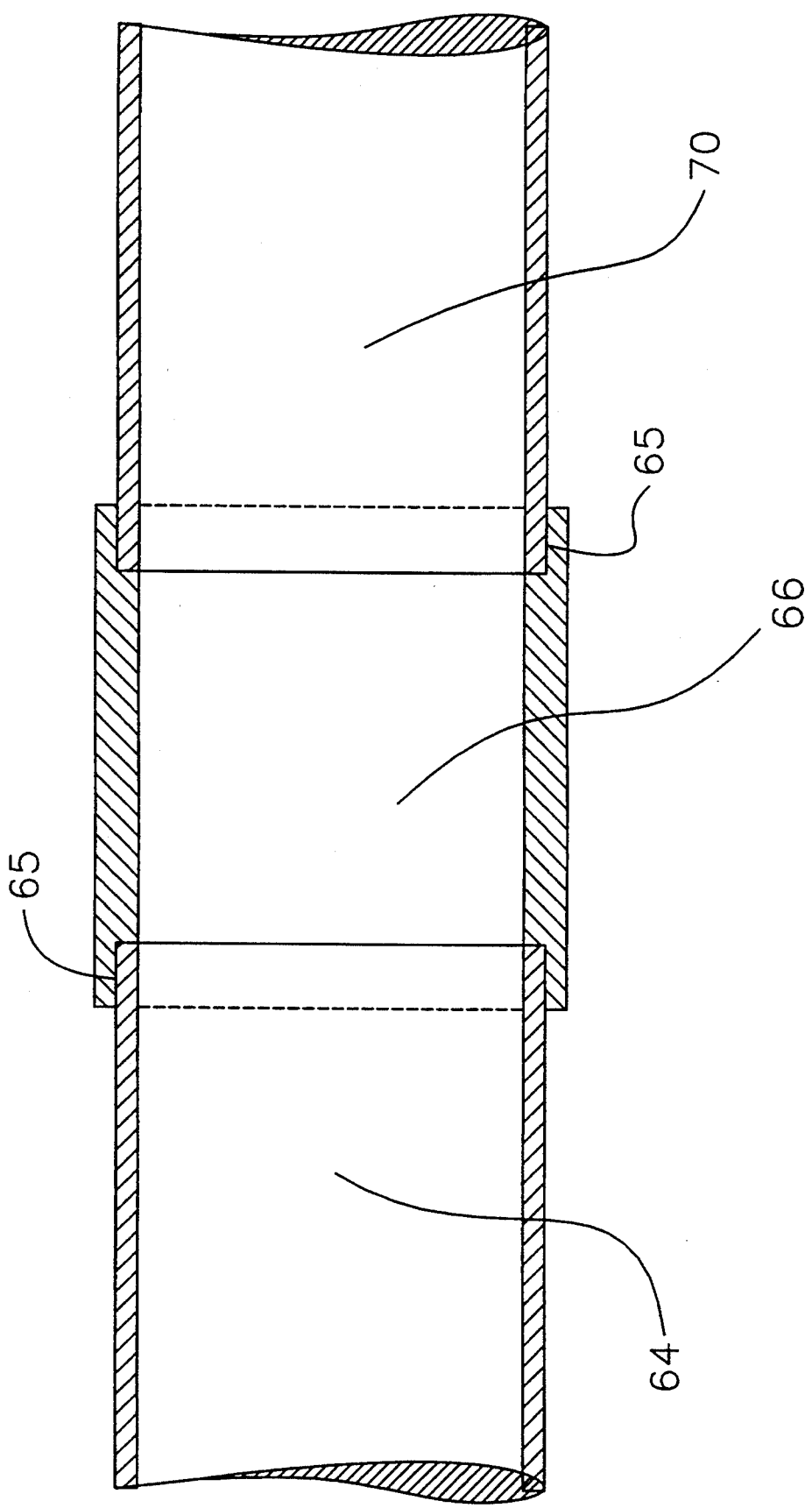
FIG. 7 is another segmented view of a proposed collapsible collar attachment.

There are many practical ways of arranging thermoplastic couplings. For example, FIGS. 6 and 7 show embodiments whereby arrangements of machined parts work well combining rigid thermoplastics joints 60 and 66 with the fiberglass reinforced plastic ducts 58 and 62, and 64 and 70 respectively by secured attachment at their points of contact 59 and 65. There are many chemicals which would be useful in providing a chemical bond between various thermoplastics and fiberglass resins, to provide a weld at the joint.

Figure 8:
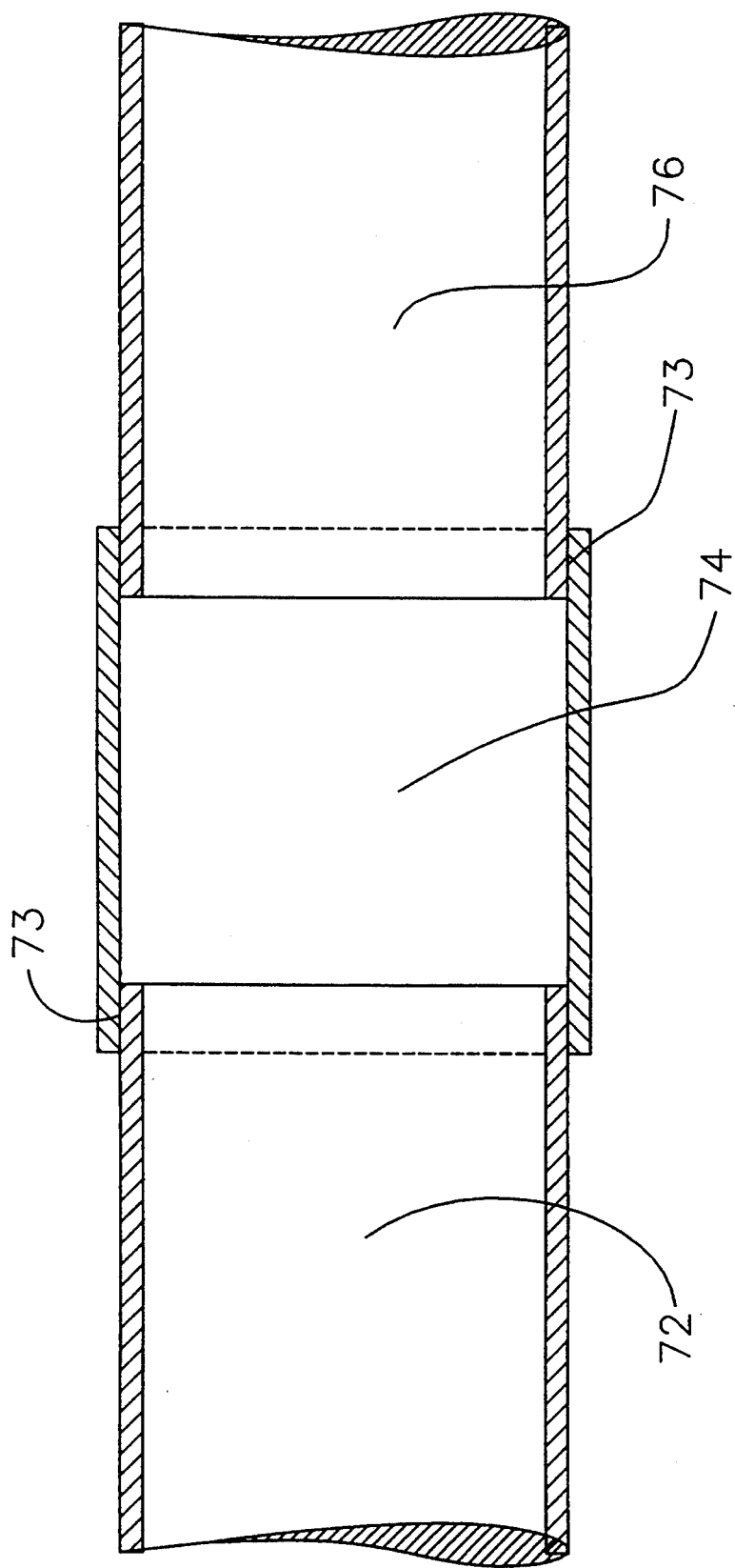
FIG. 8 is a further segmented view of a proposed collapsible collar attachment.
Figure 9:
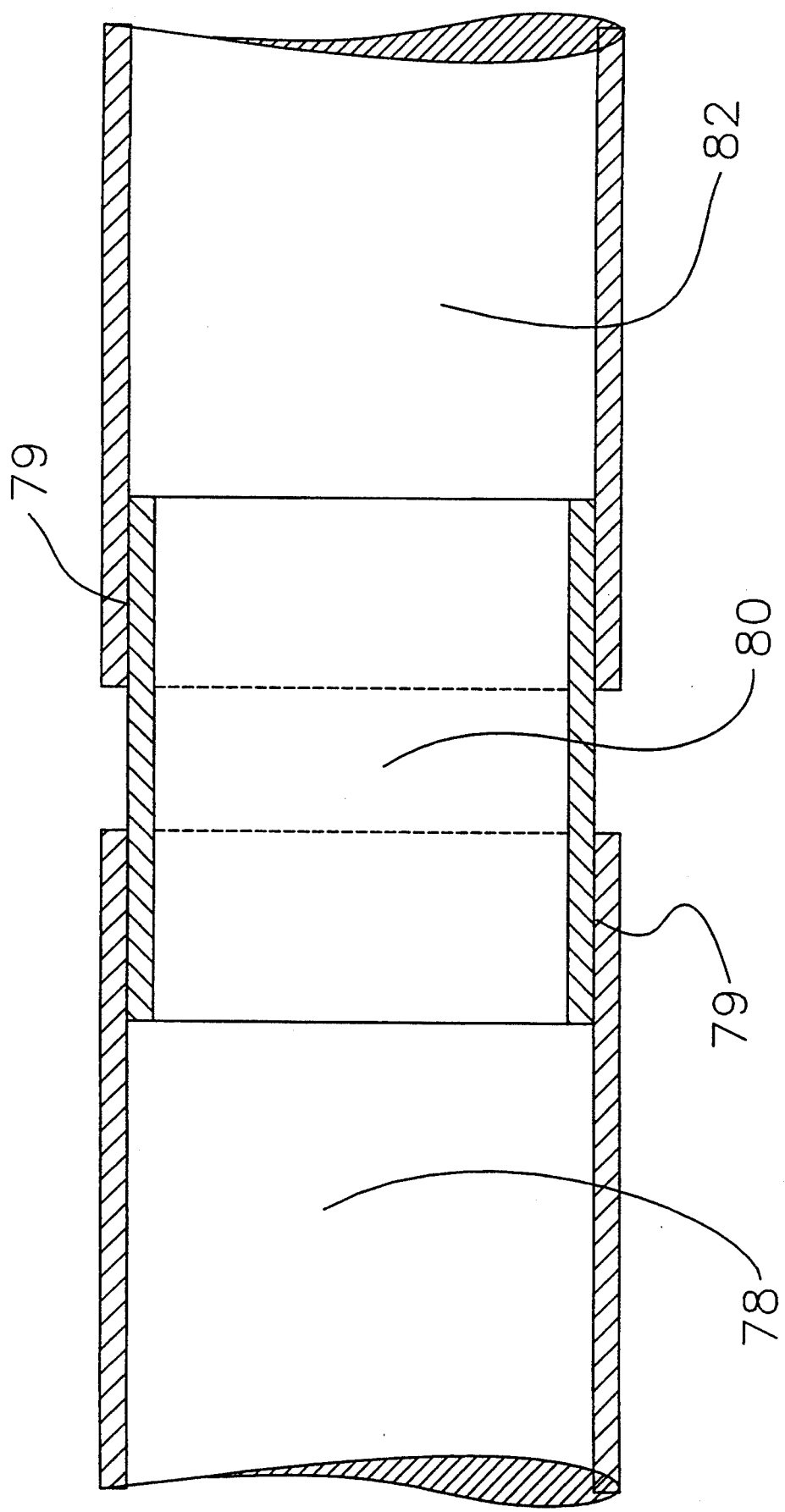
FIG. 9 is an additional segmented view of a proposed collapsible collar attachment.

FIGS. 8 and 9 are directed to further embodiments of collapsible collar couplings. FIG. 8 indicates an elastomeric collapsible collar coupling 74 with a low melt temperature; one such material is polyethylene heat shrink. This material is normally applied by heat to fasten to the ducts at points of contact 73. By leaving a space between the various pieces of fiberglass reinforced plastic, be they duct or fittings, and using the heat shrink collapsible collar coupling, in the event of a fire this coupling will melt and/or burn and collapse quite readily, opening the duct up to ambient air.

FIG. 9 shows a thermoplastic slip collapsible collar coupling 80 sized to fit within the interior of two sections 78 and 82 of duct which is not machined but merely made from stock such as polyvinyl chloride sized to fit at points of contact 79.

Those skilled in the art of plastic materials, resins and solvents, having reviewed the above disclosure, can readily make a great variety of combinations of materials to provide effective fire protection for fiberglass reinforced duct systems without departing from the spirit and scope of my invention.

What is claimed is:

1. A fire retardant exhaust duct system for conducting exhaust vapors and fumes from a building comprising sections of the duct system joined together by collapsible collar plastic joints, said sections comprise fiberglass reinforced plastic duct sections prepared from fire retardant resins having relatively high autoignition temperatures, said collapsible collar plastic joints comprise thermoplastic materials having melting points of about 220° F. to about 400° F. whereby said collapsible collar plastic joints melt and collapse off of the duct system when exposed to high temperatures.

2. A duct system according to claim 1 wherein said collapsible collar plastic joints comprise rigid thermoplastic material.

3. A duct system according to claim 1 wherein said collapsible collar plastic joints comprise elastomeric material.

4. A duct system according to claim 3 wherein said elastomeric thermoplastic material is polyethylene heat shrink.

5. A duct system according to claim 1 wherein said thermoplastic material comprises polyethylene, polyvinyl chloride or polypropylene.

6. A duct system according to claim 1 wherein said fire retardant duct sections comprise halogenated resin systems with or without antimony oxide or borax compounds.

7. A duct system according to claim 6 wherein said halogenated resin systems include antimony oxide.

8. A duct system according to claim 6 wherein said halogenated resin systems include borax.

9. A duct system according to claim 1 wherein said fire retardant duct sections comprise non-halogenated resins.

10. A duct system according to claim 1 wherein the collapsible collar thermoplastic joints are internally bonded to the joined sections.

11. A duct system according to claim 1 wherein the collapsible collar thermoplastic joints are externally bonded to the joined sections.

12. A duct system according to claim 1 wherein said sections of the duct system comprise coated metal ducts.

* * * * *